(12) United States Patent
Hall et al.

(10) Patent No.: US 10,547,190 B2
(45) Date of Patent: Jan. 28, 2020

(54) RECHARGEABLE POWERED COVERING FOR A ARCHITECTURAL OPENING

(71) Applicant: Hall Labs LLC, Provo, UT (US)

(72) Inventors: David R. Hall, Provo, UT (US); Andrew Priddis, Mapleton, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 245 days.

(21) Appl. No.: 15/587,862

(22) Filed: May 5, 2017

(65) Prior Publication Data

US 2018/0323628 A1 Nov. 8, 2018

(51) Int. Cl.

| H02J 7/00 | (2006.01) |
|---|---|
| E06B 9/42 | (2006.01) |
| E06B 9/32 | (2006.01) |
| E06B 9/72 | (2006.01) |
| E06B 9/262 | (2006.01) |
| E06B 9/388 | (2006.01) |

(52) U.S. Cl.
CPC ............ *H02J 7/0052* (2013.01); *E06B 9/262* (2013.01); *E06B 9/32* (2013.01); *E06B 9/388* (2013.01); *E06B 9/42* (2013.01); *E06B 9/72* (2013.01); *E06B 2009/2625* (2013.01); *H02J 2007/0062* (2013.01)

(58) Field of Classification Search
CPC ... E06B 9/32; E06B 9/322; E06B 9/42; E06B 9/72; E06B 9/74; Y10S 160/17; Y10S 160/05; H02J 7/0052; H02J 7/0042; H02J 7/025; H02J 2007/0062

USPC .... 160/127, 5, 310; 318/266, 264, 286, 626, 318/466

See application file for complete search history.

(56) References Cited

U.S. PATENT DOCUMENTS

| 2,149,481 | A | * | 3/1939 | Van Bosch | ............ E05F 15/71 160/168.1 P |
|---|---|---|---|---|---|
| 2,339,113 | A | * | 1/1944 | Sarran | .................... A47H 23/08 139/420 R |
| 3,134,427 | A | * | 5/1964 | Landenberger | ......... E06B 9/322 160/168.1 V |
| 3,310,099 | A | * | 3/1967 | Hunter | ...................... E06B 9/32 160/171 |
| 3,378,815 | A | * | 4/1968 | Chelminski | ............ G01V 1/201 174/101.5 |
| 4,096,903 | A | * | 6/1978 | Ringle, III | .............. E06B 9/264 160/107 |
| 4,606,157 | A | * | 8/1986 | Esposito | ................ A01G 9/227 52/173.3 |

(Continued)

FOREIGN PATENT DOCUMENTS

| EP | 0095108 | * 11/1983 |
|---|---|---|
| GB | 1578493 | * 11/1980 |

*Primary Examiner* — Janet M Wilkens

(57) ABSTRACT

An automated covering for an architectural opening—such as a window blind, a roller shade, a cellular shade, or roller wall—that can be easily recharged through a charging device that is integrated into the lower edge is disclosed. The automated covering includes a housing that holds a motor and a battery. An electrical conductor extends from the battery, down the automated covering, to the charging device at the bottom of the covering. The charging device may be a charging port, an electrical plug, or a magnetic charging device that engages with a magnetic charging dock.

13 Claims, 7 Drawing Sheets

(56) References Cited

U.S. PATENT DOCUMENTS

| | | | | |
|---|---|---|---|---|
| 4,644,990 A * | 2/1987 | Webb, Sr. | ............... | E06B 9/32<br>160/5 |
| 4,706,726 A * | 11/1987 | Nortoft | ............... | E06B 9/32<br>160/168.1 P |
| 5,413,161 A * | 5/1995 | Corazzini | ............... | E06B 9/32<br>160/168.1 P |
| 6,369,530 B2 * | 4/2002 | Kovach | ............... | E06B 9/32<br>318/16 |
| 6,484,784 B1 * | 11/2002 | Weik, III | ............... | E05F 1/006<br>160/7 |
| 6,781,335 B2 * | 8/2004 | Osinga | ............... | E04F 10/0659<br>318/139 |
| 6,812,662 B1 * | 11/2004 | Walker | ............... | E06B 9/322<br>136/243 |
| 7,034,682 B2 * | 4/2006 | Beggs | ............... | E06B 9/581<br>160/1 |
| 9,091,115 B2 * | 7/2015 | Mullet | ............... | E06B 9/307 |
| 10,113,360 B2 * | 10/2018 | Hall | ............... | E06B 9/80 |
| 2006/0185799 A1 * | 8/2006 | Kates | ............... | E06B 9/32<br>160/5 |
| 2007/0095488 A1 * | 5/2007 | Huang | ............... | E06B 9/80<br>160/310 |
| 2007/0175599 A1 * | 8/2007 | Froese | ............... | E06B 9/386<br>160/168.1 R |
| 2007/0210606 A1 * | 9/2007 | Alacqua | ............... | B60J 3/0204<br>296/97.8 |
| 2009/0277593 A1 * | 11/2009 | Stewart | ............... | E06B 9/40<br>160/127 |
| 2009/0308543 A1 * | 12/2009 | Kates | ............... | E06B 9/44<br>160/5 |
| 2010/0307696 A1 * | 12/2010 | Bolton, III | ............... | E06B 9/262<br>160/84.04 |
| 2012/0111509 A1 * | 5/2012 | Mullet | ............... | E06B 9/307<br>160/331 |
| 2012/0267060 A1 * | 10/2012 | Anderson | ............... | E06B 9/262<br>160/241 |
| 2014/0262084 A1 * | 9/2014 | Fleischman | ............... | E06B 9/58<br>160/368.1 |
| 2015/0345218 A1 * | 12/2015 | Hall | ............... | G01R 19/0092<br>160/168.1 P |
| 2018/0163466 A1 * | 6/2018 | Hall | ............... | E06B 9/80 |
| 2018/0202224 A1 * | 7/2018 | Kumar | ............... | E06B 9/42 |
| 2018/0291676 A1 * | 10/2018 | Hall | ............... | E06B 9/386 |

* cited by examiner

RECHARGEABLE POWERED COVERING FOR A ARCHITECTURAL OPENING

TECHNICAL FIELD

This invention relates generally to the field of automated coverings for architectural openings, and more specifically to rechargeable automated coverings.

BACKGROUND

Home automation is becoming increasingly common and higher in demand. Modern "smart homes" may have everything from automated lighting to automated washing machines, but one important component of any smart home is the automated window coverings. Automated window coverings are extremely convenient for controlling the amount and the timing of the sunlight that enters a home. However, one problem is keeping them constantly supplied with power.

Most automated window coverings are equipped with one or more batteries, which supply power to the coverings without the use of unsightly and cumbersome power cords. However, batteries eventually run out. Current models have addressed this issue in a number of different ways. Some automated window coverings are equipped with solar cells that automatically recharge the batteries through the power of the sun. However, solar cells are extremely slow and inefficient, especially when the sun is not visible for long stretches of time. Furthermore, they partly obstruct the view from the window and do little to improve the aesthetics of a building. Other models are designed so that the batteries can be easily removed for recharging, but this may be inconvenient and time-consuming. Still other models have a charging port in the headrail, connected to the battery, so that extension cords can connect the battery to a source of power for recharging. But long extension cords hanging down over the window also obstruct the view, look unsightly, break easily, and pose a safety hazard for small children. The headrail may also be difficult to reach.

In light of the foregoing, what is needed is a simple way to recharge the batteries in automated window coverings, or other automated coverings for architectural openings, such as retractable walls, a way which is quick and convenient, and which eliminates the need for lengthy cords or unsightly components.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow automated coverings for architectural openings to be quickly and easily recharged.

Consistent with the foregoing, an apparatus is disclosed. The apparatus comprises a powered covering for an architectural opening. The powered covering comprises at least one charging device at a lower periphery of the powered covering and at least one bendable insulated electrical conductor that extends vertically and concealably along the powered covering. The conductor may be concealed by its location within the covering, by its color, and or by its structure. The apparatus also comprises a housing atop the powered covering, which comprises a motor and a battery that powers the motor. The at least one bendable insulated conductor connects the battery to the at least one charging device. Therefore, when the at least one charging device is connected to a power supply, electrical power passes from the power supply to the charging device, through the at least one bendable insulated electrical conductor, and to the battery, thereby charging the battery, so that the battery can power the motor, which operates the powered covering.

The powered covering may be an automated blind, an automated roller shade or retractable wall, or an automated cellular shade. The charging device may be a charging port, such as a USB port; an electrical plug; or a magnetic charging device, which engages with a magnetic charging dock to automatically power and align the powered covering when the pieces engage. The housing may be a drum or a headrail. The bendable insulated electrical conductor may be woven into the material of the powered covering, sandwiched inside the material, taped or laminated to the back, or interwoven between slats of the powered covering.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
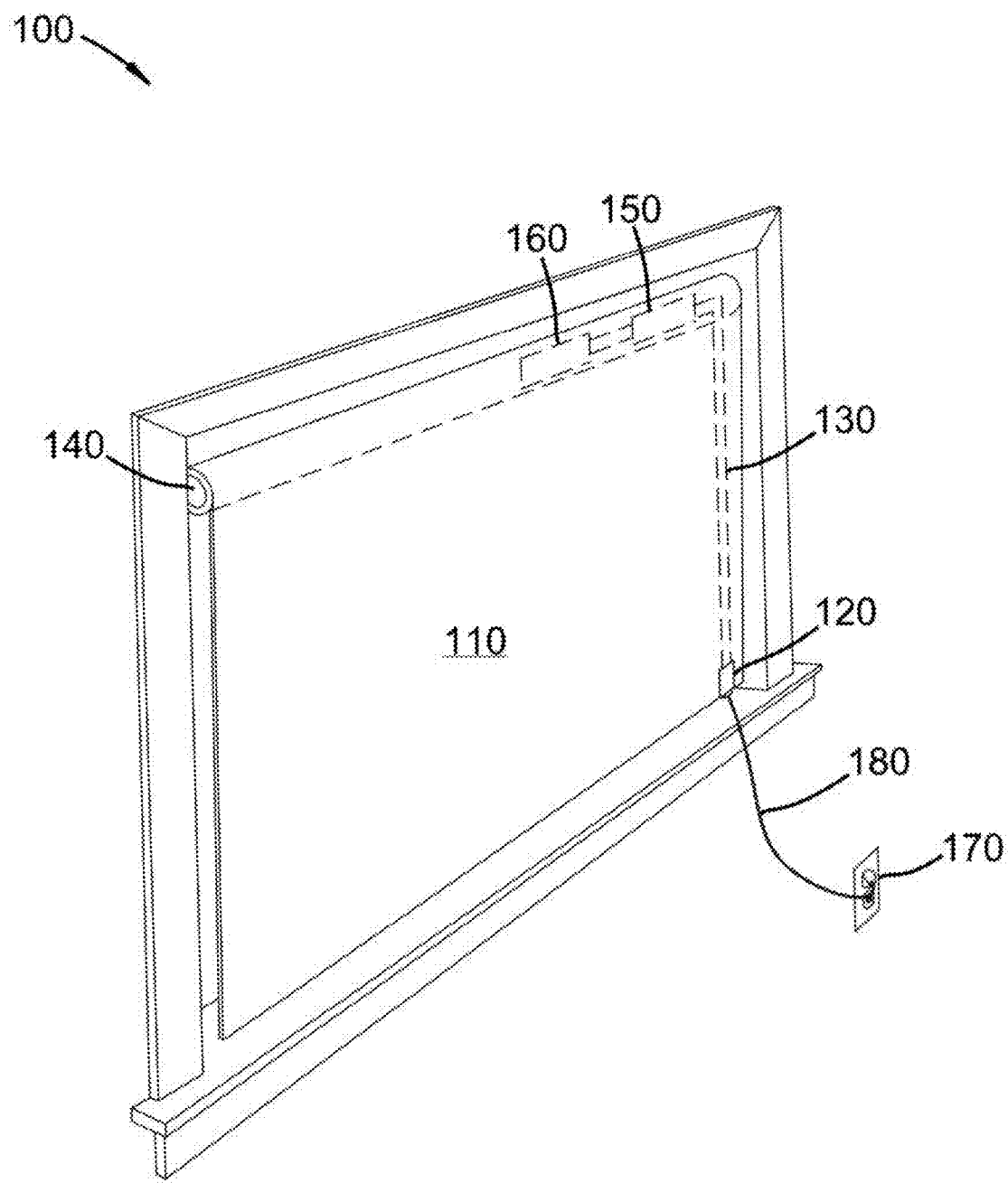
FIG. 1 depicts one embodiment of the invented apparatus.

FIG. 1 depicts one embodiment of the invented apparatus 100. The apparatus 100 comprises a powered covering for an architectural opening 110. In different embodiments, the architectural opening may be a window, a door, an opening for a removable wall, or another opening in a building structure. In different embodiments, the powered covering 110 may be automated window blinds, roller shades, cellular shades, or retractable walls, including roller walls. FIG. 1 depicts a roller shade. In one embodiment, the powered covering 110 moves between an open and a closed position, and it may do so by means of rolling, winding, collapsing, or bunching. In one embodiment, the powered covering 110 comprises a conformable material, or a flexible or bendable material. The powered covering 110 may have a variety of shapes and sizes. In one embodiment, the powered covering 110 comprises a shape substantially similar to the shape of the architectural opening that it covers. In one embodiment, the powered covering 100 comprises a rectangular configuration.

The powered covering for an architectural opening 110 comprises at least one charging device 120 at a lower periphery of the powered covering 110 and at least one bendable insulated electrical conductor 130 that extends vertically and concealably along the powered covering 110. The conductor may be concealed by its location within the covering, by its color, and or by its structure. In one embodiment, the at least one charging device 120 comprises a charging port, preferably a USB port, which may be connected to a power supply 170 by means of an extension cord 180. In another embodiment, the at least one charging device 120 is an electrical plug. In another embodiment, the at least one charging device 120 is magnetic, and may engage with a charging dock, which may also be magnetic. The magnetic charging device 120 may be one or more magnets or a housing containing magnets and electrically conductive pins. The at least one charging device 120 is located at a lower periphery of the powered covering 110. The lower periphery includes not more than the lower third portion of the powered covering 110. In different embodiments, the at least one charging device 120 may be located on a bottom edge or a side edge of the powered covering 110. In different embodiments, the at least one charging device 120 may be integrated into—for example, sandwiched between two pieces of—the powered covering 110, protrude slightly from the powered covering 110, or be concealed within and then drawn out to protrude slightly from the powered covering 110. In one embodiment, the apparatus 100 comprises only one charging device 120. In another embodiment, the apparatus 100 comprises two charging devices 120, which may be located on the extreme right and extreme left lower periphery of the powered covering 110. In other embodiments, the apparatus 100 comprises more than two charging devices 120.

In one embodiment, the at least one bendable insulated electrical conductor 130 comprises one or more wires. In one embodiment, the at least one bendable insulated electrical conductor 130 is windable or bunchable, such that the at least one bendable insulated electrical conductor 130 can move and flex with the powered covering 110, taking on the shape that the powered covering 110 may take as it moves between open and closed positions. The at least one bendable insulated electrical conductor 130 extends concealably along the powered covering 110. In one embodiment, the at least one bendable insulated electrical conductor 130 is woven into the powered covering 110, such as when the powered covering 110 is an automated roller shade or retractable wall. In one embodiment, the at least one bendable insulated electrical conductor 130 is sandwiched in the middle of two pieces of the powered covering 110. In one embodiment, the at least one bendable insulated electrical conductor 130 is taped or laminated to a back side of the powered covering 110. In one embodiment, the at least one bendable insulated electrical conductor 130 is interwoven between slats of the powered covering 110, such as when the powered covering 110 is an automated blind. In one embodiment, the at least one bendable insulated electrical conductor 130 comprises a nylon-braided cable. One embodiment comprises only one bendable insulated electrical conductor 130. This embodiment requires a common ground plane through which current can travel at the battery 160 and at the at least one charging device 120. Another embodiment comprises two bendable insulated electrical conductors 130, one of which is positive and one of which is negative. In one embodiment, the two bendable insulated electrical conductors 130 are joined in a single cable housing. Other embodiments comprise more than two bendable insulated electrical conductors 130. The at least one bendable insulated electrical conductor 130 extends vertically along the powered covering 110. In one embodiment, the at least one bendable insulated electrical conductor 130 extends substantially an entire vertical length of the powered covering 110.

The apparatus 100 also comprises a housing 140 atop the powered covering 110. The housing 140 comprises a motor 150 and a battery 160 that powers the motor 150. The motor 150 drives the powered covering 110, preferably such that it moves automatically between open and closed positions. In one embodiment, the housing 140 is a headrail, such as when the powered covering 110 comprises automated blinds. In one embodiment, the housing 140 comprises a drum, such as when the powered covering 110 is an automated roller shade or retractable wall, and the automated roller shade or retractable wall winds around the drum. In one embodiment, the battery 160 is a battery pack. The battery 160 should be a rechargeable battery. The at least one bendable insulated electrical conductor 130 connects the battery 160 to the at least one charging device 120. Therefore, when the at least one charging device 120 is connected to a power supply 170, electrical power passes from the power supply 170 to the charging device 120, through the at least one bendable insulated electrical conductor 130, and to the battery 160, thereby charging the battery 160, so that the battery 160 can power the motor 150, which operates the powered covering 110. In this way, the powered covering 110 can be constantly supplied with electrical power for operation without the need for long extension cords extending directly to the motor 150 or to the battery 160, and without requiring removal of the battery 160.

Figure 2:
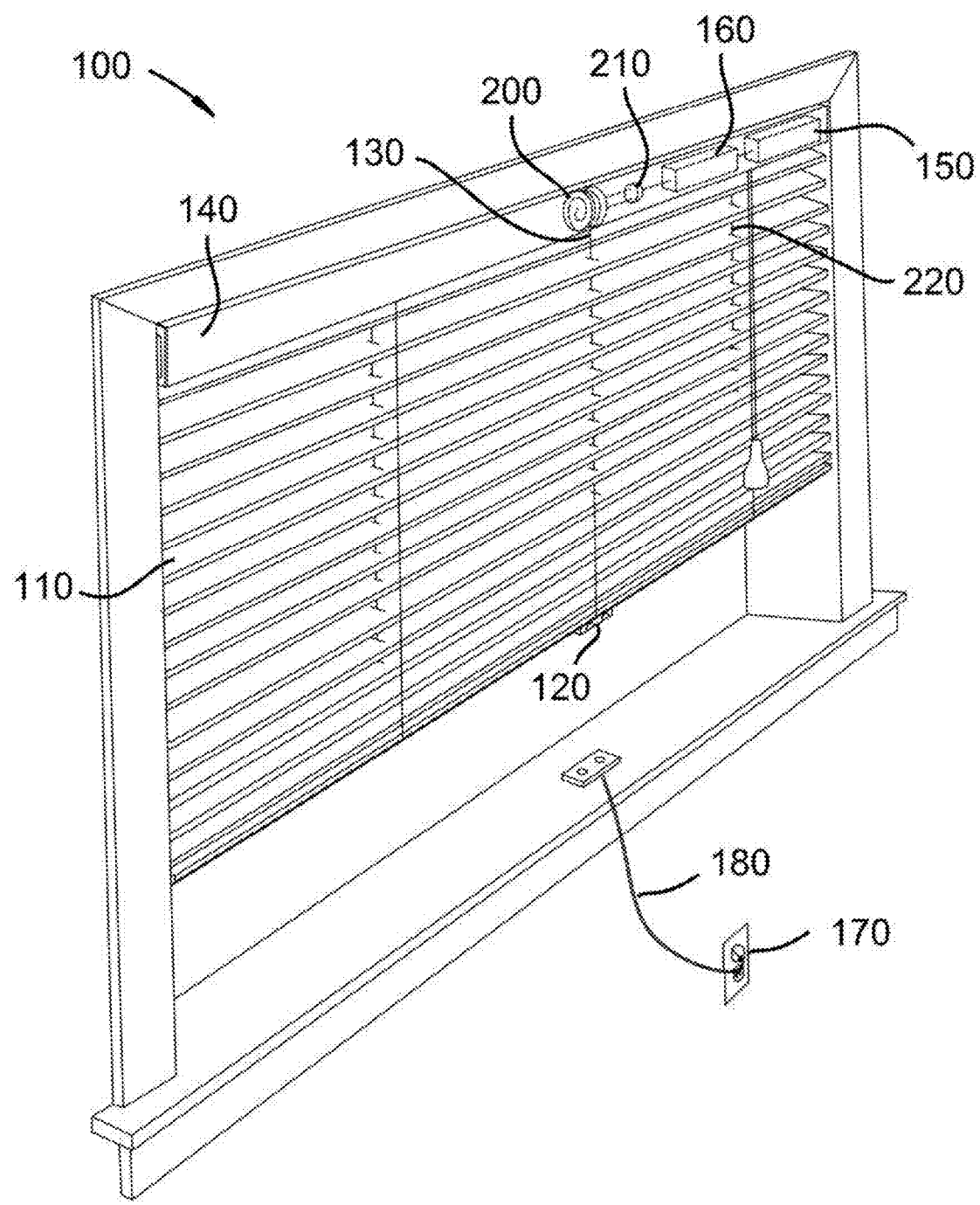
FIG. 2 depicts one embodiment of the invented apparatus in which the powered covering is an automated window blind.

FIG. 2 depicts one embodiment of the invented apparatus 100 in which the powered covering 110 is an automated window blind. In this embodiment, the housing 140 may comprise a headrail. A motor 150 and a battery 160 are displaced within the headrail. At least one bendable insulated electrical conductor 130 extends vertically and concealably along the automated blind, connecting the battery 160 to at least one charging device 120 located at a lower periphery of the automated blind. In one embodiment, the at least one bendable insulated electrical conductor 130 comprises nylon-braided cable. In one embodiment, the at least one bendable insulated electrical conductor 130 is interwoven between slats of the automated blind. The conductor may be concealed by its location within the covering, by its color, and or by its structure. In this way, the at least one bendable insulated electrical conductor 130 may be camouflaged because a typical automated window blind comprises several long horizontal slats that are held together by cords that are interwoven between the blind slats. In one embodiment, the at least one bendable insulated electrical conductor 130 may comprise a central cord, as depicted in FIG. 2, or a side cord, that is interwoven between the blind slats. In another embodiment, the at least one bendable insulated electrical conductor 130 may comprise a cord that runs, interwoven between slates of the automated blind, alongside a lift cord 220 that is used to open or close the blinds. In one embodiment, the at least one bendable insulated electrical conductor 130 may comprise the lift cord. One embodiment comprises only one bendable insulated electrical conductor 130. One embodiment comprises two bendable insulated electrical conductors 130, which may be integrated into a single cable, and one is positive and one is negative. Other embodiments comprise more than two bendable insulated electrical conductors 130, which may be connected to more than one charging device 120, for example, on two opposite sides of the automated blind. In one embodiment, the at least one bendable insulated electrical conductor 130 bunches up, similar to the cords interwoven between the blind slats, when the automated blind is lifted, moving into an open position. In another embodiment, the at least one bendable insulated electrical conductor 130 is wound around a spring-loaded reel 200 displaced within the housing 140 that retracts the at least one bendable insulated electrical conductor 130 when the automated blind is lifted. In one embodiment, a slip ring 210 allows the at least one bendable insulated electrical conductor 130 to wind around the spring-loaded reel 200 and still connect to the battery 160 without twisting.

Figure 3:
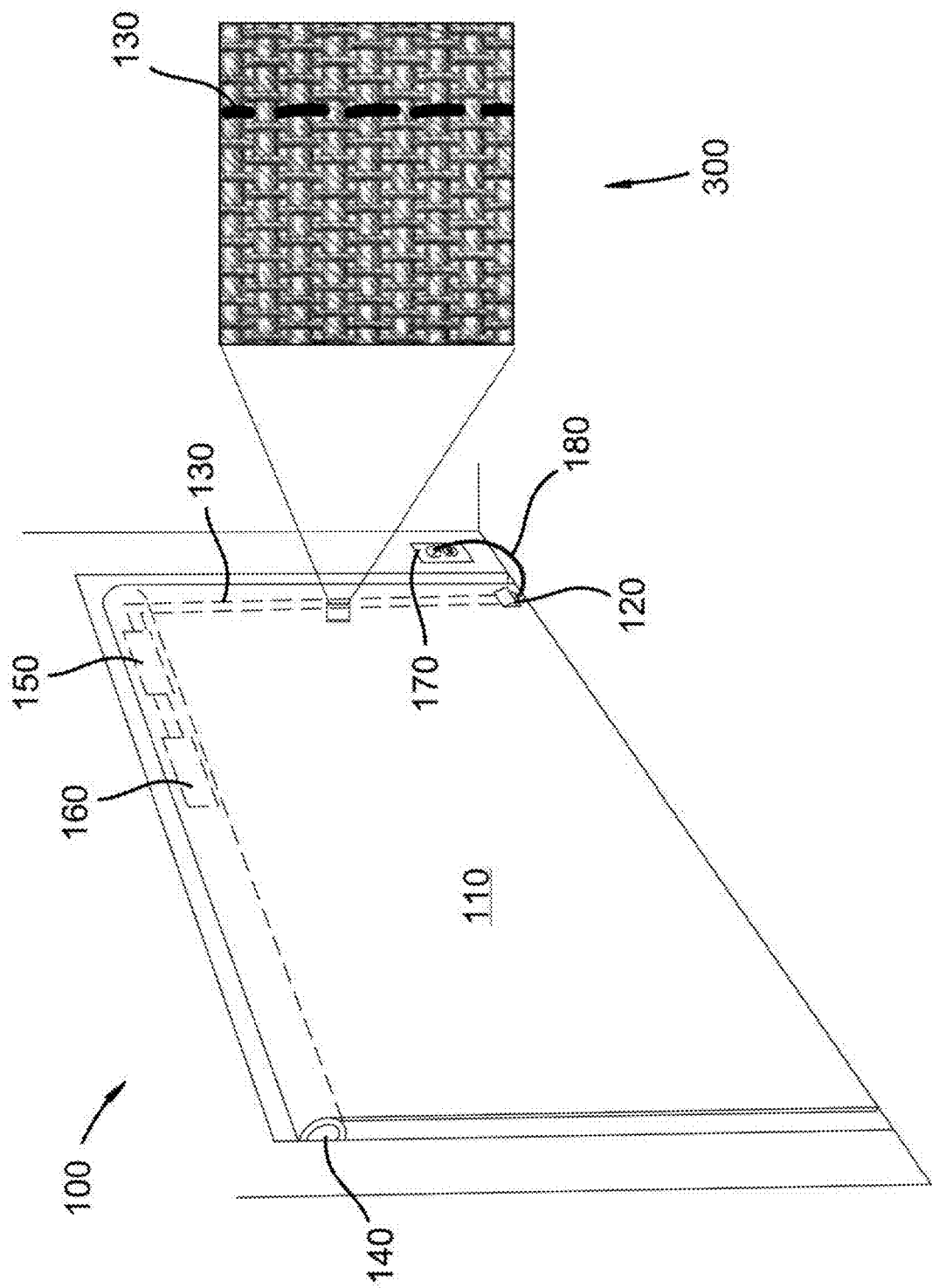
FIG. 3 depicts one embodiment of the invented apparatus in which the powered covering is an automated retractable wall.

FIG. 3 depicts one embodiment of the invented apparatus 100 in which the powered covering 110 is an automated retractable wall, especially a roller wall. The depiction and description may apply likewise to a roller shade. In this embodiment, the housing 140 may comprise a drum that the retractable wall winds around. A motor 150 and a battery 160 are displaced within the drum, which is attached to the retractable wall at a top edge of the retractable wall. At least one bendable insulated electrical conductor 130 is connected to the battery 160 inside the drum and extends out from the drum to the retractable wall, preferably through holes in the drum. The at least one bendable insulated electrical conductor 130 extends vertically and concealably along the automated retractable wall, connecting the battery 160 to at least one charging device 120 located at a lower periphery of the automated retractable wall. The at least one charging device 120 may be located at a bottom edge or a side edge of the retractable wall. One embodiment comprises only one bendable insulated electrical conductor 130. One embodiment comprises two bendable insulated electrical conductors 130, one of which is positive and one of which is negative. Other embodiments comprise more than two bendable insulated electrical conductors 130, which may be connected to more than one charging device 120, for example, on two opposite sides of the retractable wall. In one embodiment, the at least one bendable insulated electrical conductor 130 comprises a wire. In one embodiment, the at least one bendable insulated electrical conductor 130 is woven into the retractable wall, as depicted in blown-up cutout 300. In one embodiment, the at least one bendable insulated electrical conductor 130 is sandwiched between two sheets that comprise the retractable wall. In one embodiment, the at least one bendable insulated electrical conductor 130 is taped or laminated to a back side of the retractable wall. In one embodiment, the retractable wall comprises a sound-attenuating material. In one embodiment, the retractable wall comprises mass-loaded vinyl (MLV). In other embodiments, the retractable wall comprises another fabric.

Figure 4:
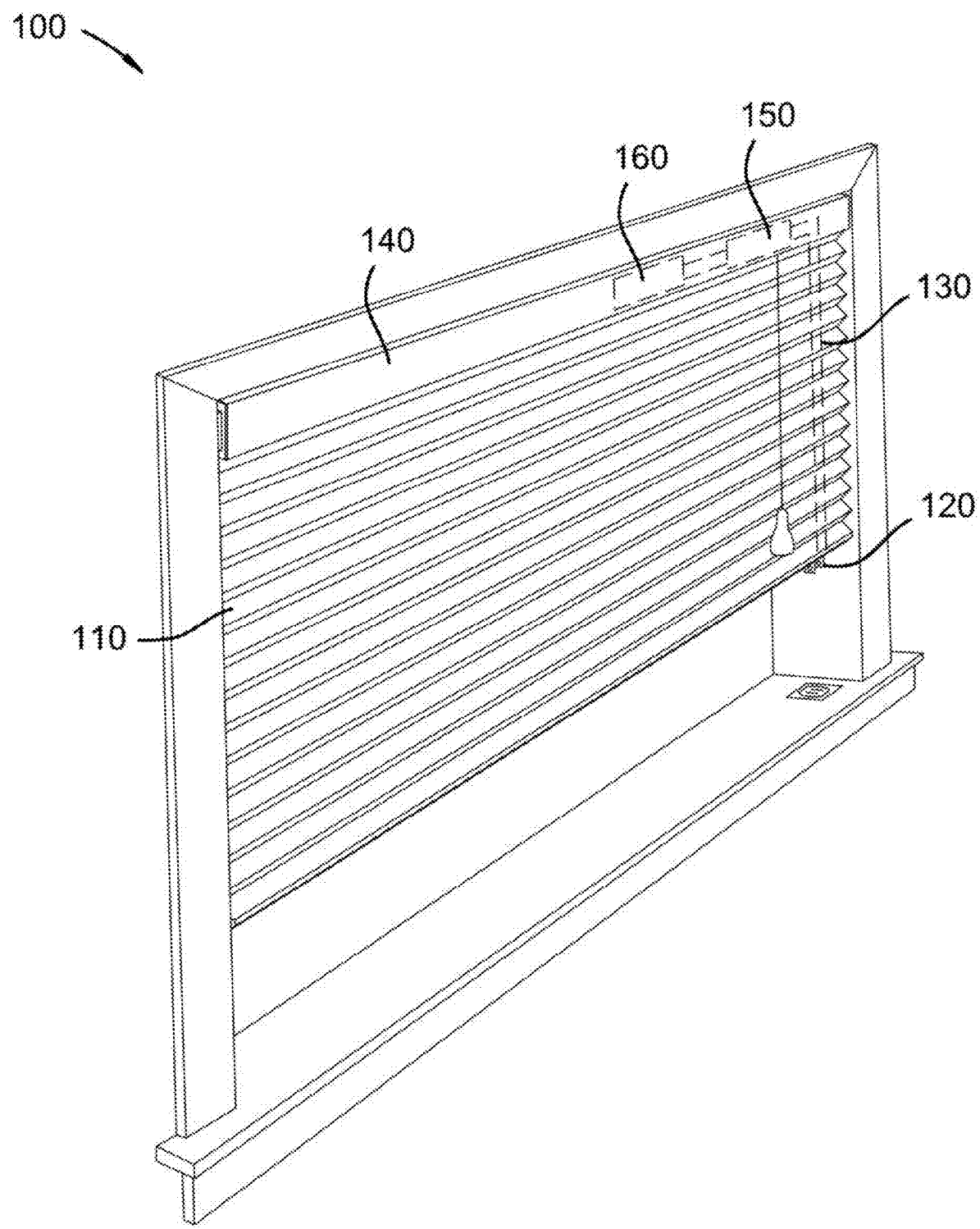
FIG. 4 depicts one embodiment of the invented apparatus in which the powered covering is an automated cellular shade.

FIG. 4 depicts one embodiment of the invented apparatus 100 in which the powered covering 110 is an automated cellular shade. In this embodiment, the housing 140 may comprise a headrail. A motor 150 and a battery 160 are displaced within the headrail. At least one bendable insulated electrical conductor 130 extends vertically and concealably along the automated cellular shade, connecting the battery 160 to at least one charging device 120 located at a lower periphery of the automated cellular shade. In one embodiment, the at least one bendable insulated electrical conductor 130 comprises nylon-braided cable. In one embodiment, the at least one bendable insulated electrical conductor 130 is run down the middle interior of the automated cellular shade. One embodiment comprises only one bendable insulated electrical conductor 130. One embodiment comprises two bendable insulated electrical conductors 130, which may be integrated into a single cable, and one is positive and one is negative. Other embodiments comprise more than two bendable insulated electrical conductors 130, which may be connected to more than one charging device 120, for example, on two opposite sides of the automated cellular shade. In one embodiment, the at least one bendable insulated electrical conductor 130 bunches up when the automated cellular shade is lifted into an open position. In another embodiment, the at least one bendable insulated electrical conductor 130 is wound around a spring-loaded reel 200 (as depicted in FIG. 2) displaced within the housing 140 that retracts the at least one bendable insulated electrical conductor 130 when the automated cellular shade is lifted.

Figure 5A:
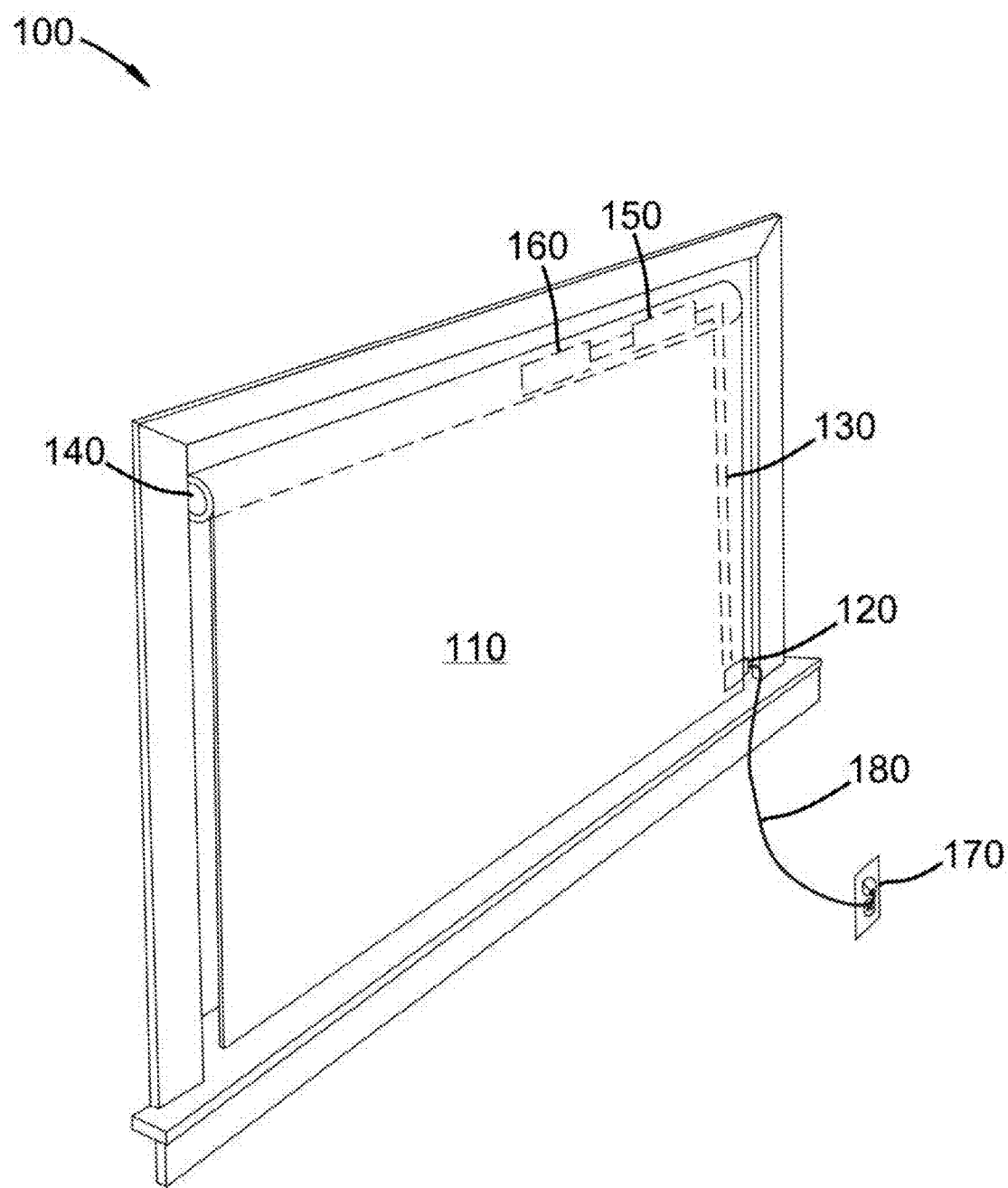
FIG. 5A depicts one embodiment of the apparatus in which the at least one charging device is a charging port.
Figure 5B:
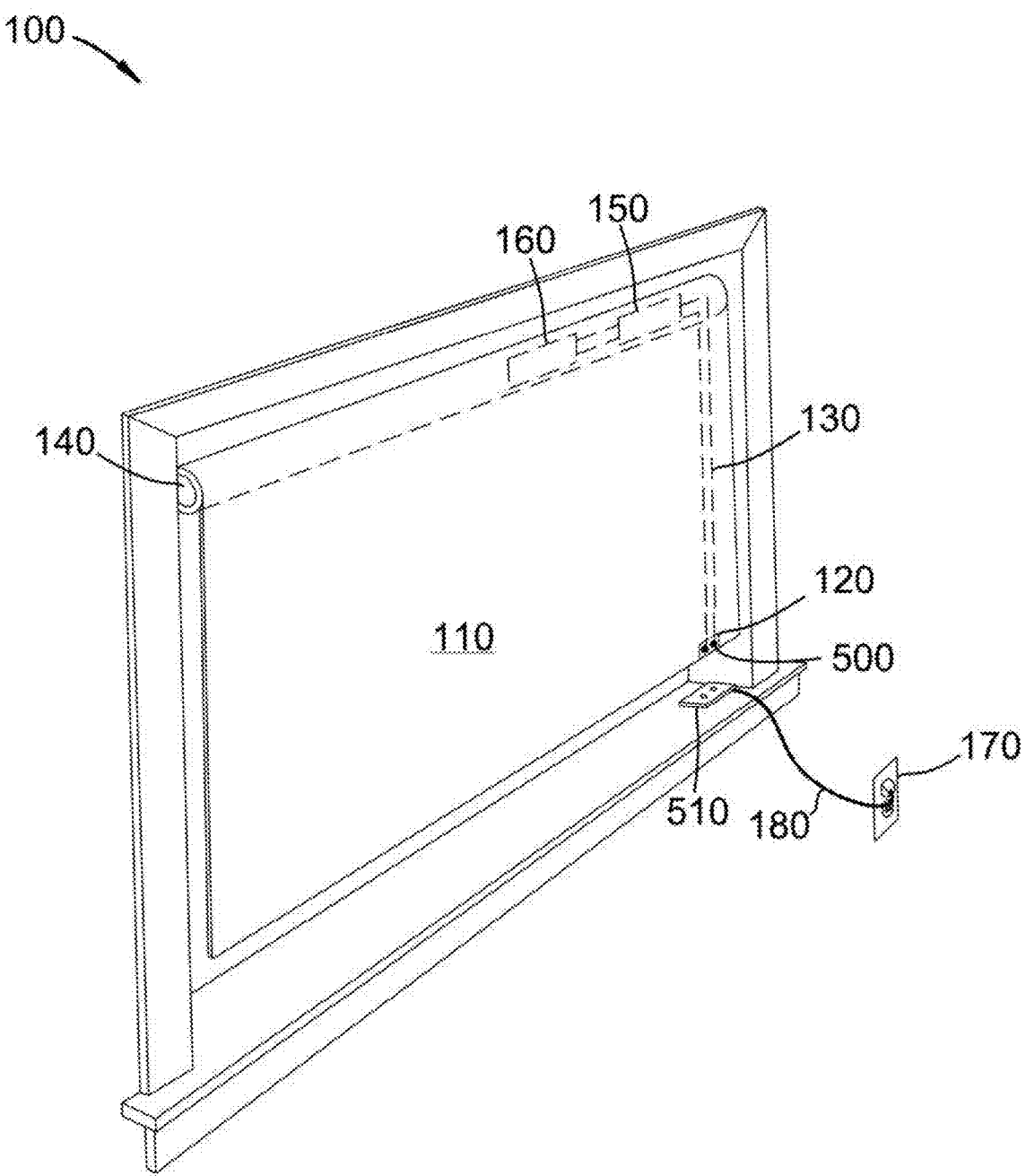
FIG. 5B depicts one embodiment of the apparatus in which the at least one charging device is magnetic.
Figure 5C:
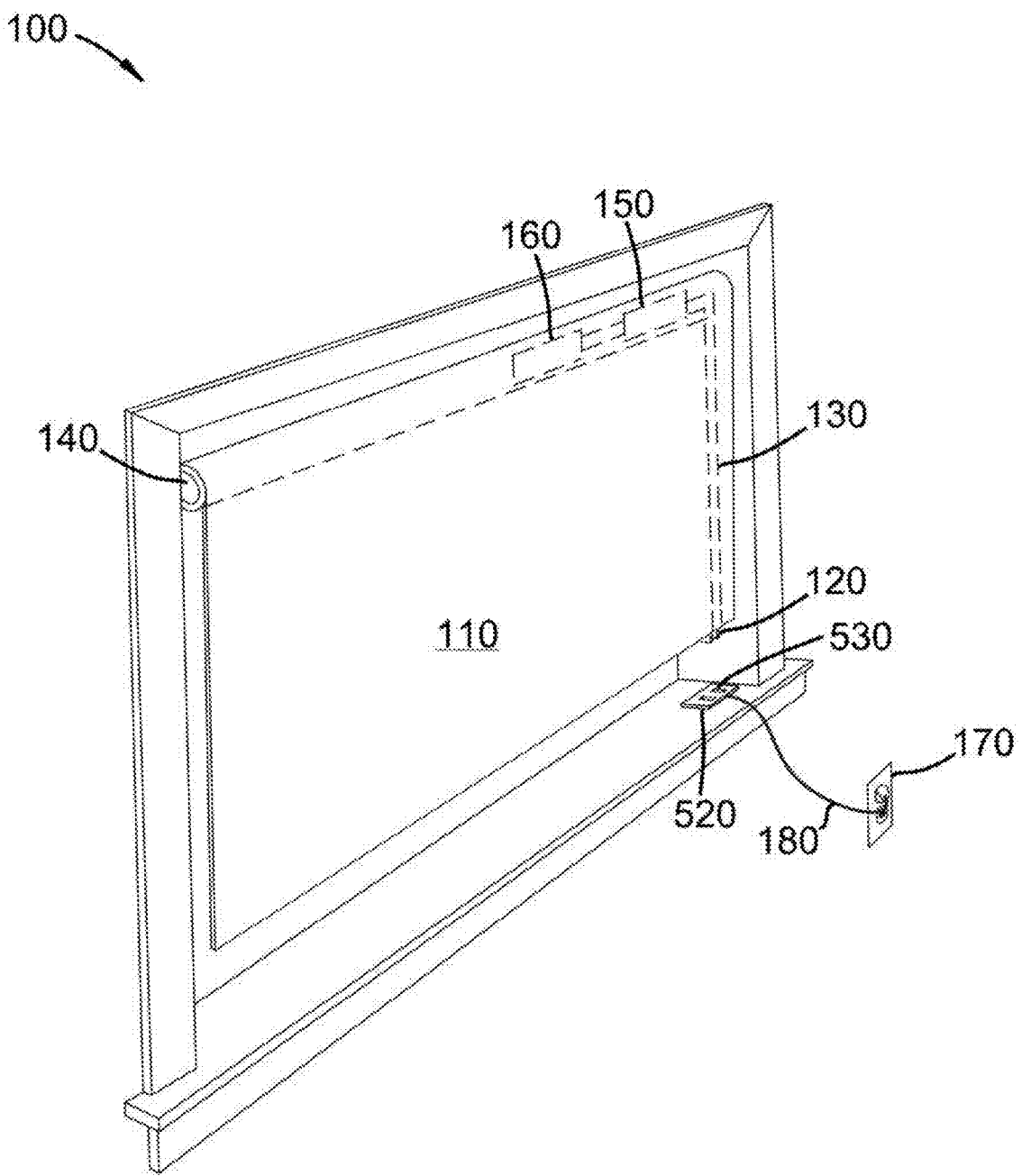
FIG. 5C depicts one embodiment of the apparatus in which the at least one charging device is an electrical plug.

FIG. 5A, FIG. 5B, and FIG. 5C depict differing embodiments of a charging device 120 in embodiments of the apparatus 100. FIG. 5A depicts one embodiment of the apparatus 100 in which the at least one charging device 120 is a charging port. In one embodiment, the charging port is a USB port. In another embodiment, the charging port is a barrel plug connector. In other embodiments, the charging port may be another of a variety of available charging ports. In one embodiment, the charging port is connected to a power supply 170 by means of an extension cord 180, which may be a USB power cord or cord with a barrel plug, etc. Each charging port is at a lower periphery of the powered covering 110. The lower periphery includes not more than the lower third portion of the powered covering 110, so that the charging port is easily within reach. In different embodiments, each charging port is integrated into—for example, sandwiched between two pieces of—the powered covering 110, protrudes slightly from the powered covering 110, or is concealed within and then drawn out to protrude slightly from the powered covering 110. In one embodiment, each charging port is located at a bottom edge of the powered covering 110, so that the port opening is accessed from the bottom of the powered covering 110. In one embodiment, each charging port is located at a side edge of the powered covering 110, so that the port opening is accessed from the side of the powered covering 110. In one embodiment, each charging port is located slightly above the bottom or side edge of the powered covering 110, and the port opening protrudes slightly from the powered covering 110 so that the port opening is accessible from this interior location within the powered covering 110. In one embodiment, the apparatus 100 comprises only one charging port. In another embodiment, the apparatus 100 comprises two charging ports, which may be located on the extreme right and extreme left lower periphery of the powered covering 110. In other embodiments, the apparatus 100 comprises more than two charging ports.

FIG. 5B depicts one embodiment of the apparatus 100 in which the at least one charging device 120 is magnetic. In one embodiment, each magnetic charging device is one or more magnets 500. In another embodiment, each magnetic charging device is a housing containing one or more magnets and electrically conductive pins. In one embodiment, each magnetic charging device engages with a magnetic charging dock 510, which may be connected to a power supply 170 by means of an extension cord 180 or may be powered by batteries or solar energy. The magnetic charging dock 510 may be very thin. In one embodiment, the powered covering 110 is automatically aligned and supplied with power when each magnetic charging device engages magnetically with the magnetic charging dock 510. Each magnetic charging device is at a lower periphery of the powered covering 110. The lower periphery includes not more than the lower third portion of the powered covering 110, so that the magnetic charging device is within reach. In different embodiments, each magnetic charging device is integrated into—for example, sandwiched between two pieces of—the powered covering 110, protrudes slightly from the powered covering 110, or is concealed within and then drawn out to protrude slightly from the powered covering 110. In one embodiment, each magnetic charging device is located at a bottom edge of the powered covering 110, so that it can be accessed from the bottom of the powered covering 110. In one embodiment, each magnetic charging device is located at a side edge of the powered covering 110, so that it can be accessed from the side of the powered covering 110. In one embodiment, each magnetic charging device is located slightly above the bottom or side edge of the powered covering 110, and the magnetic charging device protrudes slightly from the powered covering 110 so that the magnetic charging device is accessible from this interior location within the powered covering 110. In this embodiment, the magnetic charging device may be located at a distance from the edge of the powered covering 110 that is equivalent to the thickness of the magnetic charging dock 510. In this way, the magnetic charging device and the magnetic charging dock 510 will engage at a point when the powered covering 110 is completely closed, and the presence of the magnetic charging dock 510 won't prevent the powered covering 110 from being able to close completely. The magnetic charging dock 510 may be located behind the powered covering 110 such that the magnetic charging dock 510 is not visible when the powered covering 110 is closed, thereby improving the aesthetics of the apparatus 100. In one embodiment, the apparatus 100 comprises only one magnetic charging device. In another embodiment, the apparatus 100 comprises two magnetic charging devices, which may be located on the extreme right and extreme left lower periphery of the powered covering 110. In other embodiments, the apparatus 100 comprises more than two magnetic charging devices. In embodiments that comprise more than one magnetic charging device, each magnetic charging device may engage with one common magnetic charging dock 510, or each magnetic charging device may engage with its own respective magnetic charging dock 510.

FIG. 5C depicts one embodiment of the apparatus 100 in which the at least one charging device 120 is an electrical plug. In one embodiment, each electrical plug engages with a charging dock 520, which may be connected to a power supply 170 by means of an extension cord 180 or may be powered by batteries or solar energy. The charging dock 520 may comprise an electrical outlet 530. The charging dock 520 may be very thin. In another embodiment, each electrical plug engages directly with an electrical outlet. In one embodiment, the powered covering 110 is automatically aligned and supplied with power when each electrical plug engages with the charging dock 520 or when the electrical plug engages with the electrical outlet. Each electrical plug is at a lower periphery of the powered covering 110. The lower periphery includes not more than the lower third portion of the powered covering 110, so that the electrical plug is easily within reach. In different embodiments, each electrical plug protrudes slightly from the powered covering 110 or is concealed within and then drawn out to protrude slightly from the powered covering 110. In one embodiment, each electrical plug is located at a bottom edge of the powered covering 110, so that it can be accessed from the bottom of the powered covering 110. In one embodiment, each electrical plug is located at a side edge of the powered covering 110, so that it can be accessed from the side of the powered covering 110. In one embodiment, each electrical plug is located slightly above the bottom or side edge of the powered covering 110, and the electrical plug can protrude slightly from the powered covering 110, and may extend in length, so that the electrical plug is accessible from this interior location within the powered covering 110. In this embodiment, the electrical plug may be located at a distance from the edge of the powered covering 110 that is equivalent to the thickness of the charging dock 520. In this way, the electrical plug and the charging dock 520 will engage at a point when the powered covering 110 is completely closed, and the presence of the charging dock 520 won't prevent the powered covering 110 from being able to close completely. The charging dock 520 may be located behind the powered covering 110 such that the charging dock 520 is not visible when the powered covering 110 is closed, thereby improving the aesthetics of the apparatus 100. In one embodiment, the apparatus 100 comprises only one electrical plug. In another embodiment, the apparatus 100 comprises two electrical plugs, which may be located on the extreme right and extreme left lower periphery of the powered covering 110. In other embodiments, the apparatus 100 comprises more than two electrical plugs. In embodiments that comprise more than one electrical plug, each electrical plug may engage with one common charging dock 520, or each electrical plug may engage with its own respective charging dock 520.

The invention claimed is:

1. A powered covering for an architectural opening comprising:
   a flexible sheet that covers an architectural opening, the sheet comprising at least one bendable insulated electrical conductor woven into the sheet's material and extending vertically and concealably along the sheet;
   at least one charging device at a lower periphery of the sheet; and
   a drum atop the sheet, the drum housing a motor and a battery that powers the motor, wherein the at least one bendable insulated electrical conductor connects the battery to the at least one charging device.

2. The powered covering of claim 1, wherein the powered covering is an automated roller shade or retractable wall.

3. The powered covering of claim 1, wherein the sheet winds around the drum.

4. The powered covering of claim 1, wherein the sheet comprises mass-loaded vinyl.

5. The powered covering of claim 1, wherein the at least one charging device is a charging port.

6. The powered covering of claim 5, wherein the charging port is a USB port.

7. The powered covering of claim 1, wherein the at least one charging device is connected to a power supply by means of an extension cord.

8. The powered covering of claim 1, wherein the at least one charging device is an electrical plug.

9. The powered covering of claim 1, wherein the at least one charging device is magnetic.

10. The powered covering of claim 1, wherein the at least one charging device engages with a charging dock.

11. The powered covering of claim 10, wherein the charging dock is magnetic.

12. The powered covering of claim 11, wherein the powered covering is automatically aligned and supplied with power when the at least one charging device engages magnetically with the charging dock.

13. The powered covering of claim 1, wherein the electrical conductor is concealed by its camouflaged color.

* * * * *